July 26, 1938.  E. G. CARROLL ET AL  2,124,761
BRAKE
Filed May 18, 1932  2 Sheets-Sheet 1
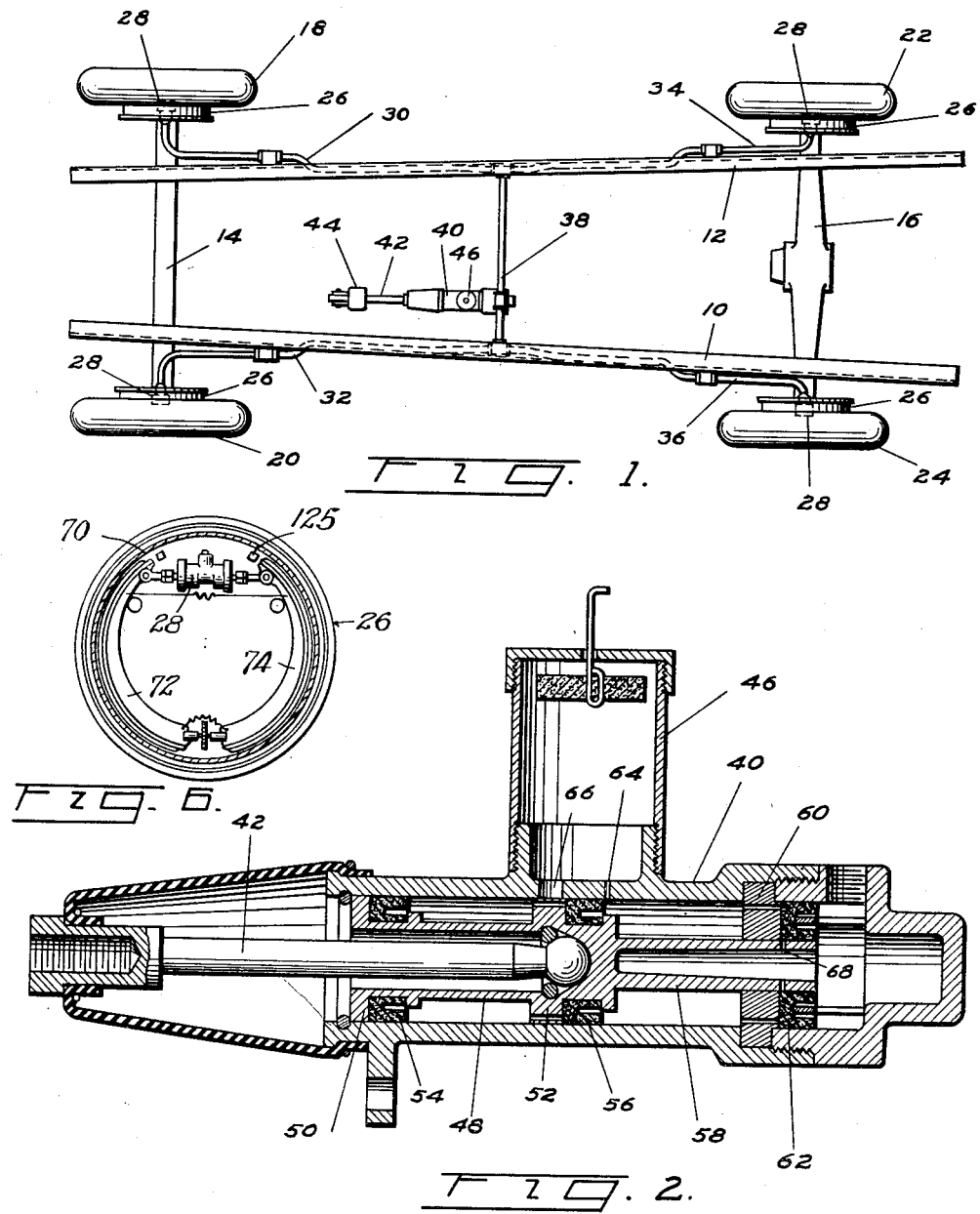
INVENTORS.
EUGENE G. CARROLL
CECIL H. TAYLOR
BY Jerome R. Cox
ATTORNEY July 26, 1938.  E. G. CARROLL ET AL  2,124,761

BRAKE

Filed May 18, 1932  2 Sheets-Sheet 2

INVENTORS.
EUGENE G. CARROLL
CECIL H. TAYLOR
BY
Jerome R. Cox
ATTORNEY.

Patented July 26, 1938

2,124,761

UNITED STATES PATENT OFFICE 2,124,761

BRAKE

Eugene G. Carroll and Cecil H. Taylor, South Bend, Ind., assignors to Bendix Aviation Corporation, South Bend, Ind., a corporation of Delaware Application May 18, 1932, Serial No. 612,137

10 Claims. (Cl. 188—152)

This invention relates to brake apparatus and is shown as applied to a hydraulic brake system.

Heretofore devices for the braking of vehicles have either depended upon the manual effort exerted by the operator as multiplied by various leverage arrangements, or have depended upon some additional source of power either for applying the brakes independently or for assisting the operator in applying the brakes.

In applying brakes through a foot actuated mechanical or hydraulic leverage, the power conveniently obtained is limited. A certain minimum movement of the pedal actuated shoes to the drum is required in order to provide adequate clearance when the brake is not applied and on account of the wear of the various parts. A certain maximum movement of the brake pedal can not be exceeded by reason of the limitations of the space in the vehicle and by reason of the limitations of comfort of movement of the operator. Power brakes usually utilize some outside source of power or utilize the torque created by the braking action itself for aiding in applying the brakes. The latter class usually include only mechanical connections.

One of the objects of this invention is to utilize the torque created by the braking action efficiently for assisting in applying the brakes.

A further object of the invention is to utilize the braking torque developed in a hydraulic braking system for increasing the volume of fluid supplied to the wheel cylinders thereof and/or for decreasing the volumetric capacity of said wheel cylinders, thereby decreasing the volume of fluid necessary to be displaced by the master cylinder and enabling the operator to use higher leverages in applying the brakes.

A feature of the invention is a servo wheel cylinder.

A further feature of the invention is the incorporation of a servo wheel cylinder within an ordinary wheel cylinder.

Further objects and features of the invention will be apparent after a reading of the subjoined specification and claims and after a consideration of the attached drawings in which:

Figure 1 is a plain view of a chassis of an automobile equipped with a braking system illustrating our invention;

Figure 2 is a view in vertical section and on an enlarged scale showing the master cylinder of the Figure 1;

Figures 6 is a view in vertical section of a complete brake utilizing our invention.

Figure 3:
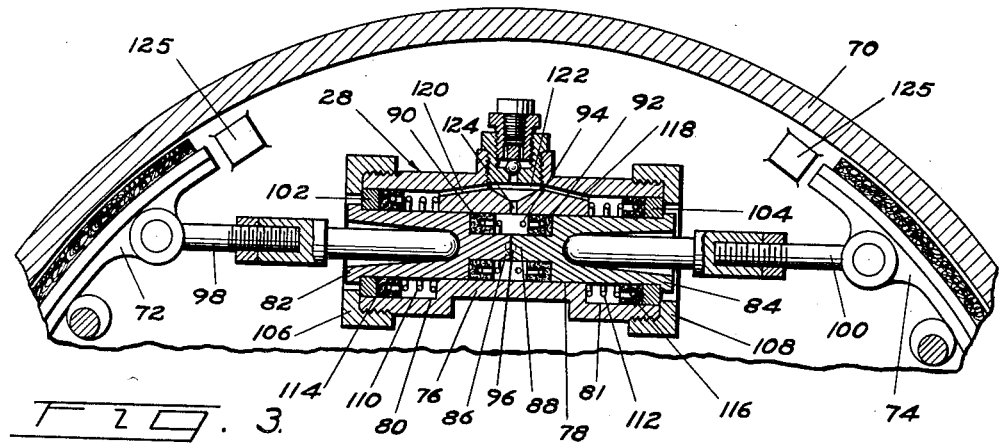
Figure 3 is a view in vertical section and on an enlarged scale showing a fragment of one of the wheels and showing the wheel cylinder mounted therein.

In Figure 1 there is shown a chassis of an automobile formed with side rails 10 and 12, a front axle 14, a rear axle 16, front wheels 18 and 20 supporting the front axle 14, and read wheels 22 and 24 supporting the rear axle 16.

The wheels 18, 20, 22, and 24 are provided with brakes 26 adapted to be operated by wheel cylinders 28 to which liquid under pressure is supplied by branch conduits 30, 32, 34, 36, and a main conduit 38. The fluid is forced through said conduits by means of a master cylinder 40 which is operated through a piston rod 42 by means of a foot pedal 44.

The master cylinder 40 is provided with a reservoir 46 for a reserve supply of fluid and with a plunger 48. The plunger 48 is formed with a pair of spaced pistons 50 and 52 provided with annular cup packings 54 and 56 respectively and is provided with a forwardly extending concentric projection 58. The cylinder is also provided with a fixed head 60 having associated therewith an annular cup packing 62. The forward end of the projection 58 extends through the head 60 and the packing 62. The packing 62 may be prevented from substantial movement and held in place by any convenient means. As shown, a tube is utilized which contacts at its forward end with the front of the cylinder and at its rearward end seats within the annular groove formed in the packing, thus preventing the packing from moving far in advance of the head 60. The cylinder wall is formed with a constricted port 64 normally positioned in advance of the cup packing 56 and with a relatively large opening 66 normally covered by the piston 52, both said port 64 and said opening 66 leading to the reservoir 46. The forward end of the projection 58 is formed adjacent to the rear end of the cup 62 with a plurality of ports such as 68 by which liquid may escape from the system ahead of the cup 62 to the portion of the cylinder rearwardly thereof and thus may escape through the port 64 back to the reservoir to compensate the system for temperature changes.

Each wheel cylinder 28 is positioned in a drum 70 and is connected to brake shoes 72 and 74. Each cylinder is formed of a cylindrical casting 76 having the central portion formed with a relatively small bore 78 and the outer portions formed with relatively large bores 80 and 81. Within the cylinders are a pair of cylindrical pistons 82 and 84 having diameters corresponding to the bore 78 and formed with central projections 86 and 88 which are adapted to contact with each other and to limit the inward movement of the pistons. Annular cup packings 90 and 92 associated with the pistons 82 and 84 respectively are held in place by a spring 94. Liquid is supplied to each wheel cylinder from one of the conduits 30, 32, 34 and 36 through an opening 96 and serves to spread the pistons 82 and 84 which in turn act upon adjustable links 98 and 100 pivotally connected to the shoes 72 and 74.

There are also provided in each cylinder 28 annular pistons 102 and 104 having diameters substantially corresponding to the bores 80 and 81. These pistons are normally held in contact with caps 106 and 108 by means of relatively strong springs 110 and 112 which also serve to maintain the cups 114 and 116 in operative association with the pistons 102 and 104 respectively. The cylinder is formed with a plurality of passages such as 118, 120, 122 and 124 which communicate with each other and allow free passage of fluid from the large diameter bores 80 and 81 to the small diameter bore 78. Embossments 125 on the backing plate may serve to limit the circumferential movement of the shoes 72 and 74.

Figure 4:
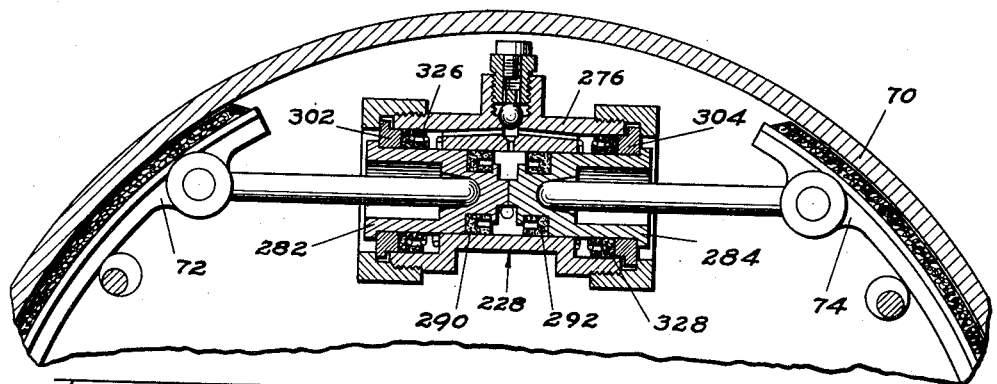
Figure 4 is a view similar to Figure 3 showing a modified form of wheel cylinder.

The cylinder 228 shown in Figure 4, is substantially the same as the cylinder 28 shown in Figure 3. However, the annular cups 290 and 292 are secured in grooves in the ends of the pistons 282 and 284 and packings 326 and 328 are provided for cushioning the contact of the pistons 282 and 284 with the pistons 302 and 304. Moreover the pistons 302 and 304 are provided with flanges which are adapted to contact with the ends of the casting 276. Thus means are provided for limiting the inward movement of the pistons 302 and 304 and thus for limiting the amount of pressure developed by the braking torque and the amount of fluid displaced thereby.

Ball check valves shown in the central part of the wheel cylinders of Figures 3 and 4 are used to prevent the sucking in of air during the bleeding operation.

Figure 5:
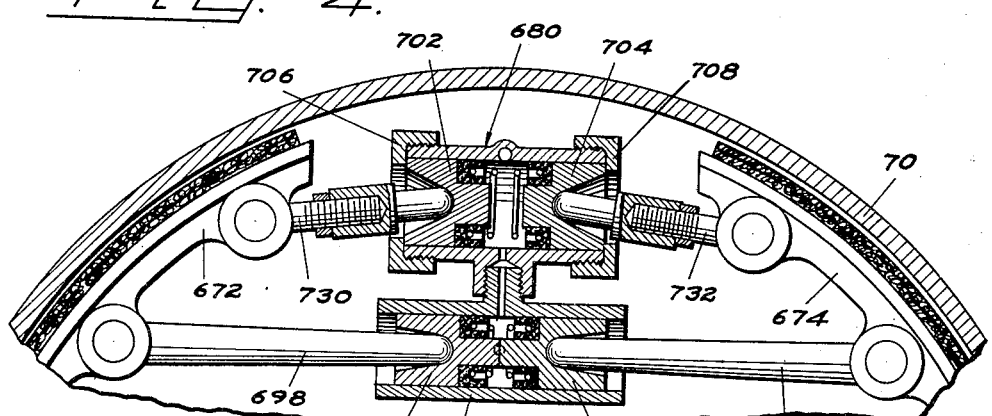
Figure 5 is a view similar to Figures 3 and 4 showing a modified arrangement in which two wheel cylinders are provided.

In Figure 5 the wheel cylinder 628 is provided with a pair of pistons 682 and 684 and is connected to the shoes 672 and 674 by means of links 698 and 700. There is associated with the cylinder 628 another cylinder 680 having a larger diameter and provided with pistons 702 and 704. The pistons 702 and 704 are normally maintained in engagement with caps 706 and 708 and are adapted to be actuated by links 730 and 732 pivotally connected to the shoes 672 and 674 respectively. Inward movement is limited by central projections thereon.

In the operation of the structure disclosed, pressure upon the pedal 44 acts through the piston rod 42 to move the piston 48 forward thus cutting off the port 64 and the port 68. Liquid trapped ahead of the cup 62 is forced to the brakes by means of the projection 58 and that trapped ahead of the piston cup 56 but rearwardly of the cup 62 is forced past the cup 62 and thus also to the brakes.

As soon as a small quantity of liquid enters each wheel cylinder 28 through the port 96, the pistons 82 and 84 are spread apart, moving the shoes 72 and 74 into contact with the drum 70. The wiping action resulting from the rotation of the drum causes the braking torque to be exerted upon one or the other of the links 98 and 100 which thus returns one of the pistons 82 or 84 to the position shown and causes the braking torque to act upon one of the pistons 102 or 104. This forces liquid from one of the large bores 80 or 81 through the passages 118, 120, 122, and 124 to the small bore 78 and thus increases the fluid supplied to the small bore and the pressure applying the shoes to the drum.

Inasmuch as the effective area of the pistons 102 and 104 is greater than that of the pistons 82 and 84, during the phase of the braking action after the wiping action begins to exert force upon one of the links 98 or 100, the latter must move out faster than the former are approaching each other and the shoes must be wedged more tightly against the drum until they can no more be forced against the drum, whereupon the braking torque anchors upon the liquid in the system. Inasmuch as the cup 62 prevents liquid from passing the head 60, assuming that the pedal is held stationary, this force does not react upon the piston 52 and the cup 56 but is taken solely upon the small diameter of the forward projection 58. Therefore a relatively small force exerted upon the pedal is able to hold the brake. If it were necessary to move the pedal farther to increase the braking effect, the full force of the application would react on the pedal. However, the force developed by the servo is sufficient to accomplish any braking possible without sliding the wheels, so that in practice no great force ever reacts upon the pedal. At the same time, inasmuch as some force reacts upon the pedal through the projection 58, the brake is entirely controllable. The embossments 125 prevent abnormal movements of the shoes.

When the pedal is released the piston 52 and the projection 58 will return to the position shown in Figure 1. Since the projection 58 fits in the partition 60 with an ordinary machine fit, liquid will flow back through the ports 68 around the projection 58 and also around the packing 62 and through the ports in the partition 60 to the reservoir 46. Thus the pressure acting on the wheel brakes is relieved and the brakes will release.

The embodiment shown in Figure 4, however, is prefererd to that shown in Figure 3. Therein, the movement inward of the pistons 302 and 304 is limited by the stop as described above and the effect of the servo or wiping action is to amplify the supply of liquid in the system so that it is possible to apply the brakes with relatively small movement of the master piston. Therefore it is possible to use a relatively large leverage between the pedal and the master cylinder piston.

In the embodiment shown in Figure 5, the combined servo and operating cylinders are separated. Therefore two separate cylinders 628 and 680 are provided. The operation, however, is the same as that described above in connection with Figures 1, 2 and 3. However, the movement inward of the piston 702 or 704 as the case may be in cylinder 680 forces additional fluid into the motor formed by the cylinder 628 and thus increases the volume of fluid therein.

It is clear that movement of the pedal actuates the plunger 52 to force liquid through the system to move the friction element into contact with the drum and that said pedal and plunger, together with the liquid serve as parts of a device for applying said element to the drum at a predetermined ratio comprising the ratio between the force exerted on the pedal and the applying force acting on the shoes solely as a result of the force applied to the pedal, the ratio being determined by the relative diameters of the plunger 52 and the pistons 682. Moreover, the fluid serves as an anchor receiving the full braking torque. The head 60 and the packing 62 serve as means for reducing the ratio of the reaction felt upon the pedal to the total torque of the friction element to substantially less than the said ratio between the force initially exerted on the pedal and the applying force acting on the shoes solely as a result of said force applied to the pedal, the reaction ratio being determined by the relative diameters of the piston 58 and the pistons 704. The master cylinder disclosed herein is also disclosed and is claimed in a copending application of Eugene G. Carroll, Serial Number 25,720, filed June 10, 1935.

It is to be understood that the various embodiments of our invention described above, are for the purpose of illustration only, and various changes may be made therein without departing from the spirit and scope of the invention.

We claim:

1. In a fluid braking system, a pedal, a wheel cylinder, means for converting foot power into brake applying pressure, separate means associated with said wheel cylinder for converting braking torque into fluid pressure, and means for preventing said fluid pressure from reacting with full force upon said pedal.

2. In a fluid brake system, a pedal, a master cylinder, a wheel cylinder, connections between said cylinders, means associated with said master cylinder for converting movement of said pedal into fluid pressure, means associated with said wheel cylinder for converting fluid pressure into brake applying force, means associated with said wheel cylinder for converting braking torque into fluid pressure, and means associated with said master cylinder for preventing said fluid pressure from reacting with full force upon said pedal.

3. In a fluid braking system, a wheel cylinder, a master cylinder, connections between said cylinders, a piston in said master cylinder having a relatively large area, a piston in said master cylinder having a relatively small area, means for moving said pistons to force fluid from said master cylinder to said wheel cylinder to apply the brakes, means responsive to brake application for increasing the fluid pressure in said system, and means for preventing said last mentioned increase in fluid pressure in said system from reacting on said relatively large area piston.

4. In a fluid braking system, a master cylinder provided with a piston, a wheel cylinder provided with a piston, connections between said master cylinder and said wheel cylinder, means for operating said master cylinder piston for forcing fluid under pressure through said connections to said wheel cylinder, means associated with said wheel cylinder and operated by the braking torque for applying additional pressure to the fluid in said system, and means associated with said master cylinder for preventing the pressure produced by said torque reaction from acting upon said master cylinder piston.

5. In a fluid braking system, a master cylinder provided with a piston, a wheel cylinder provided with a piston, connections between said master cylinder and said wheel cylinder, means for operating said master cylinder piston for forcing fluid through said connections to said wheel cylinder, means associated with said wheel cylinder and operated by the braking torque for supplying additional fluid to said wheel cylinder, and means associated with said master cylinder for preventing the pressure produced by said torque reaction from acting upon said master cylinder piston.

6. In an automotive vehicle, a rotating element, a friction element associated with said rotating element, a fluid motor comprising a wheel cylinder having two oppositely acting pistons, means for increasing the pressure of fluid in said fluid motor for acting to apply the friction element to the rotating element, means comprising a second wheel cylinder actuated by said friction element for increasing the volume of fluid in said fluid motor, and means for limiting said increase in volume.

7. In a hydraulic braking system, a wheel cylinder, a pair of small area pistons located in said wheel cylinder, a pair of large area pistons located in said wheel cylinder, means connected to said small area pistons for utilizing brake applying force transmitted through said small area pistons, means for transmitting braking torque at times to each of said large area pistons, means connecting the space occupied by fluid acted on by said large area pistons with the space occupied by fluid acting on said small area pistons, and means for limiting the movements of the large area pistons.

8. In an automotive vehicle, a rotating element, a friction element associated with said rotating element, a wheel cylinder having a pair of pistons therein, means for increasing the pressure of fluid in said wheel cylinder for applying the friction element to the rotating element, means comprising another wheel cylinder for increasing the supply of fluid to said first named wheel cylinder, and means including portions of said last named cylinder for limiting said increase in the supply of fluid.

9. In a hydraulic braking system, a wheel cylinder, a friction element, a small area piston located in said wheel cylinder, a large area piston located in said wheel cylinder, means connected to said small area piston for utilizing brake applying force transmitted through said small area piston and for transmitting said force to said friction element, means including said last named means and said small area piston for transmitting braking torque generated by said friction element to said large area piston, and means for connecting the space occupied by fluid acted on by said large area piston with the space occupied by fluid acting on said small area piston.

10. In a braking system a pedal, a rotating drum, a friction element adapted to be forced into contact with said drum, means connecting said pedal and said element for applying said element to said drum at a predetermined ratio between the force exerted on the pedal and the applying force acting on the friction element solely as a result of the force applied to the pedal and serving as an anchor for receiving substantially the full braking torque, and means included as a part of said first named means for reducing the ratio of the reaction of the torque felt on the pedal to the total torque of the friction element to substantially less than the first mentioned ratio.

EUGENE G. CARROLL.
CECIL H. TAYLOR.